simultaneously connected to any one of the three thermocouples, in which event both the devices 35 and 36 would be sensitive to temperature at the same location in the fluid flow path.

I show in Fig. 1, three parallel conduits comprising three similar fluid flow paths through the boiler, with the utilization of equalizing or mixing boxes at various points along the path. In Fig. 2 and Fig. 3 I show two parallel conduits, and in Fig. 2 they are carried completely through the boiler as separate flow paths having no equalizing boxes. It will be apparent that I am not limited in my invention to two or three flow paths or to the use of equalizing boxes, but I contemplate broadly the utilization of one or more conduits comprising a continuous fluid flow path wherein liquid under pressure enters at one end and vapor of desired quantity and quality is discharged from the other end without appreciable storage or circulation.

Having thus described my invention and preferred embodiments thereof, I desire it to be distinctly understood that I am not to be limited thereby except as to the claims in view of prior art.

What I claim as new and desire to secure by Letters Patent of the United States, is:

1. Apparatus for automatically controlling the operation of a vapor generator having a once-through fluid passage receiving liquid under pressure at one end and delivering superheated vapor only at the other end and heated by elements of combustion, comprising in combination, liquid inflow regulating apparatus, supply means for the elements of combustion, control means actuated by electron discharge devices for said regulating apparatus and responsive to relation between liquid inflow and vapor outflow, and control means actuated by electron discharge devices for controlling the supply of the elements of combustion and responsive to conditions of the vapor outflow, both of said control means further responsive to an indication of temperature in the fluid flow path beyond the saturation line.

2. Apparatus for automatically controlling the operation of a vapor generator having a once-through fluid passage receiving liquid under pressure at one end and delivering superheated vapor only at the other and heated by elements of combustion, comprising in combination, a vapor outflow meter, a liquid inflow meter, a thermostat sensitive to temperature at a location in the passage wherein is superheated vapor, a second thermostat sensitive to temperature at a location in the passage, a pressure indicator of vapor outlet pressure, a temperature indicator of vapor outlet temperature; hydraulically actuated regulating means of the rate of liquid inflow to the generator, control means for said hydraulically actuated means positioned by said meters and by said first-named thermostat, hydraulically actuated regulating means of the rate of supply of the elements of combustion to the furnace, and control means for said last-named hydraulically actuated means positioned by said pressure indicator, said temperature indicator and said second-named thermostat.

3. Apparatus for automatically controlling the operation of a vapor generator having a once-through fluid passage receiving liquid under pressure at one end and delivering superheated vapor only at the other and heated by elements of combustion, comprising in combination, a vapor outflow meter, a liquid inflow meter, a thermostat sensitive to temperature at a location in the passage wherein is superheated vapor, a second thermostat sensitive to temperature at a location in the passage, a pressure indicator of vapor outflow pressure, a temperature indicator of vapor outflow temperature; hydraulic control means for regulating the liquid inflow, electrical means for remotely actuating said hydraulic control means and responsive to said meters and to said first-named thermostat, hydraulically actuated control means for varying the rate of supply of the elements of combustion, and electrical means for remotely actuating said second-named hydraulically actuated control means and responsive to said temperature indicator, said pressure indicator and said second-named thermostat.

4. Apparatus for automatically controlling the operation of a vapor generator having a once-through fluid passage receiving liquid at one end and delivering superheated vapor at the other and heated by elements of combustion, comprising in combination, a regulator for controlling the heating, means responsive to one or more physical characteristics of the fluid, and control means for positioning said regulator, said control means actuated by electron discharge devices responsive to said first named means.

5. Apparatus for automatically controlling the operation of a vapor-generator having small liquid storage with a high rate of evaporation and heated by elements of combustion, comprising in combination, a regulator for controlling the heating, means separately positioned responsive to a plurality of physical characteristics of the fluid, and control means conjointly positioned by said several means for positioning the regulator.

6. Apparatus for automatically controlling the operation of a vapor-generator having a once-through fluid passage receiving liquid at one end and delivering superheated vapor at the other and heated by elements of combustion, comprising in combination, a regulator for controlling the rate of supply of elements of combustion, means responsive to a plurality of physical characteristics of the fluid, and control means for positioning said regulator, said control means actuated by electron discharge devices responsive to said first-named means.

7. Apparatus for automatically controlling the operation of a vapor generator having small liquid storage with a high rate of evaporation and heated by elements of combustion, comprising in combination, liquid inflow regulating apparatus, supply means for the elements of combustion, control means for said regulating apparatus, said control means actuated by electron discharge devices responsive to relation between liquid inflow and vapor outflow, and control means for said supply means, said last-named control means actuated by electron discharge devices responsive to a plurality of conditions of the vapor outflow.

8. Apparatus for automatically controlling the operation of a vapor-generator having small liquid storage with a high rate of evaporation and heated by elements of combustion, comprising in combination, a regulator for controlling the heating, means responsive to one or more physical characteristics of the fluid, and control means for positioning said regulator, said control means actuated by electron discharge devices responsive to said first-named means.

9. Apparatus for automatically controlling the operation of a vapor-generator having small liquid storage with a high rate of evaporation and heated by elements of combustion, compris- Oct. 2, 1934.  F. KELLER ET AL  1,975,105
DUPLEX METAL ARTICLE
Filed Oct. 20, 1933
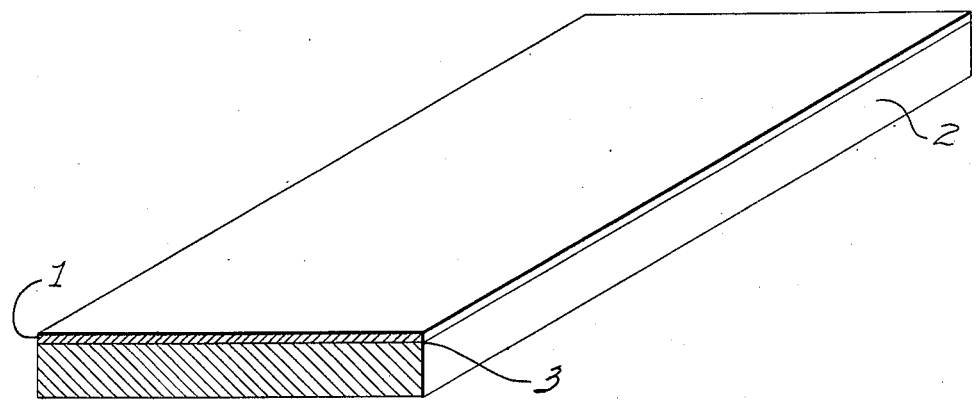
INVENTOR
Fred Keller &
BY George F. Sager
ATTORNEY